(«12») United States Patent
Takahashi et al.

(10) Patent No.: US 10,870,172 B2
(45) Date of Patent: Dec. 22, 2020

(54) LASER PROCESSING HEAD AND LASER PROCESSING SYSTEM INCLUDING THE SAME

(71) Applicant: FANUC CORPORATION, Yamanashi (JP)

(72) Inventors: Hiromitsu Takahashi, Yamanashi (JP); Toshimichi Aoki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/843,959

(22) Filed: Dec. 15, 2017

(65) Prior Publication Data

US 2018/0178323 A1 Jun. 28, 2018

(30) Foreign Application Priority Data

Dec. 22, 2016 (JP) .................................. 2016-249224

(51) Int. Cl.
*B23K 26/08* (2014.01)
*B25J 9/16* (2006.01)
(Continued)

(52) U.S. Cl.
CPC ........ *B23K 26/0884* (2013.01); *B23K 26/032* (2013.01); *B23K 26/082* (2015.10);
(Continued)

(58) Field of Classification Search
CPC .......................... B23K 26/0884; B23K 26/082; B23K 26/032; B23K 26/21; B23K 26/083;
(Continued)

(56) References Cited

U.S. PATENT DOCUMENTS 5,841,668 A * 11/1998 Pahk .................... G05B 19/404
700/160
6,392,192 B1 * 5/2002 Cole, III ................ B23K 26/04
219/121.62
(Continued)

FOREIGN PATENT DOCUMENTS

EP    1468775 A1    10/2004
EP    1992443 A1    11/2008
(Continued)

OTHER PUBLICATIONS

Octavian Bologa, Radu-Eugen Breaz, Sever-Gabriel Racz, Mihai Crenganiş, "Decision-making Tool for Moving from 3-axes to 5-axes CNC Machine-tool," Procedia Computer Science, vol. 91, 2016, pp. 184-192, retrieved from the internet, [retrieved on Aug. 13, 2019] (Year: 2019).*

(Continued)

*Primary Examiner* — Kenneth M Lo
*Assistant Examiner* — Mohammed Shafayet
(74) *Attorney, Agent, or Firm* — Karceski IP Law, PLLC (57) ABSTRACT

A laser processing head emits a laser beam to a workpiece that moves during laser processing and includes: optical path changing members that reflect, toward the workpiece, the laser beam emitted from a laser beam output section; a driver that changes posture of each of the optical path changing members; a control unit that controls the driver; and a memory device that stores target path information indicating a target path of the laser processing, in which the control unit receives information relating to a relative position of the workpiece with respect to the laser processing head, and controls the driver on the basis of the received information relating to the relative position and the target path information to perform the laser processing along the target path.

4 Claims, 8 Drawing Sheets

(51) Int. Cl.
B23K 26/082 (2014.01)
B23K 26/03 (2006.01)
G05B 19/402 (2006.01)
B23K 26/21 (2014.01)

(52) U.S. Cl.
CPC ............ *B23K 26/083* (2013.01); *B23K 26/21* (2015.10); *B25J 9/1694* (2013.01); *G05B 19/402* (2013.01); *G05B 2219/40623* (2013.01); *G05B 2219/45135* (2013.01)

(58) Field of Classification Search
CPC ................ B25J 9/1694; G05B 19/402; G05B 2219/45135; G05B 2219/40623
USPC ........................................................ 700/166
See application file for complete search history.

(56) References Cited

U.S. PATENT DOCUMENTS

| | | | | |
|---|---|---|---|---|
| 6,423,929 | B1* | 7/2002 | Muller | B23K 26/02 219/121.61 |
| 8,890,028 | B2* | 11/2014 | Mori | B23K 26/00 219/121.83 |
| 9,248,524 | B2* | 2/2016 | Kurosawa | B23K 26/14 |
| 9,636,774 | B2* | 5/2017 | Mochida | G05B 19/19 |
| 9,895,801 | B2* | 2/2018 | Oda | B25J 9/1664 |
| 10,150,213 | B1* | 12/2018 | Linnell | B25J 9/0084 |
| 2004/0206735 | A1* | 10/2004 | Okuda | B23K 26/04 219/121.78 |
| 2005/0023256 | A1* | 2/2005 | Sankaranarayanan | B23K 26/0823 219/121.63 |
| 2005/0224476 | A1* | 10/2005 | Ito | B23K 26/0846 219/121.82 |
| 2006/0157455 | A1* | 7/2006 | Kawai | B23K 26/0884 219/121.63 |
| 2007/0075055 | A1* | 4/2007 | Komatsu | B23K 26/0884 219/121.63 |
| 2007/0145027 | A1* | 6/2007 | Izawa | B23K 9/032 219/124.34 |
| 2007/0180962 | A1* | 8/2007 | Bretschneider | G05B 19/404 82/1.11 |
| 2007/0193984 | A1* | 8/2007 | Kawai | B23K 26/046 219/121.63 |
| 2009/0140684 | A1* | 6/2009 | Otsuki | G05B 19/404 318/572 |
| 2009/0173723 | A1 | 7/2009 | Nakagawa et al. | |
| 2010/0038347 | A1* | 2/2010 | Schwarz | B23K 26/0861 219/121.64 |
| 2010/0286813 | A1* | 11/2010 | Yamada | G05B 19/404 700/174 |
| 2011/0220619 | A1* | 9/2011 | Mehn | B23K 9/0953 219/108 |
| 2012/0001583 | A1* | 1/2012 | Otsuki | G05B 19/404 318/632 |
| 2012/0152911 | A1* | 6/2012 | Diez | B23K 11/11 219/117.1 |
| 2012/0255937 | A1* | 10/2012 | Oe | B23K 26/0884 219/121.63 |
| 2013/0041498 | A1* | 2/2013 | Nakamura | G05B 19/4061 700/186 |
| 2013/0043225 | A1* | 2/2013 | Schurmann | B23K 26/044 219/121.64 |
| 2013/0060373 | A1* | 3/2013 | Otsuki | G05B 19/404 700/114 |
| 2013/0116816 | A1* | 5/2013 | Otsuki | G05B 19/416 700/159 |
| 2014/0069893 | A1* | 3/2014 | Bruck | B23P 6/007 219/76.14 |
| 2015/0168713 | A1* | 6/2015 | Nowatzyk | G02B 26/0816 359/201.2 |
| 2015/0185313 | A1* | 7/2015 | Zhu | G01S 17/08 356/5.01 |
| 2015/0226949 | A1* | 8/2015 | Fukumoto | G02B 26/101 359/199.3 |
| 2016/0059347 | A1* | 3/2016 | Kogel-Hollacher | B23K 26/03 219/121.74 |
| 2016/0070097 | A1* | 3/2016 | Sonoda | G03F 7/0037 359/212.2 |
| 2016/0132039 | A1* | 5/2016 | Hsu | G05B 19/19 700/160 |
| 2016/0361937 | A1* | 12/2016 | Costin, Sr. | B44C 1/228 |
| 2016/0368110 | A1* | 12/2016 | Lu | B23Q 15/14 |
| 2017/0113304 | A1* | 4/2017 | Pluss | B23K 26/0823 |
| 2017/0326687 | A1* | 11/2017 | Li | B23K 26/702 |
| 2018/0169788 | A1* | 6/2018 | Sonner | B23K 26/0648 |

FOREIGN PATENT DOCUMENTS

| | | |
|---|---|---|
| EP | 2508293 A1 | 10/2012 |
| JP | 2004042118 | 2/2004 |
| JP | 2004314137 | 11/2004 |
| JP | 2007021551 | 2/2007 |
| JP | 2010105376 | 5/2010 |
| JP | 2010214389 | 9/2010 |
| JP | 2011067858 | 4/2011 |
| JP | 2012157867 | 8/2012 |
| JP | 2012218030 | 11/2012 |
| JP | 2015007262 | 1/2015 |
| JP | 2016055308 | 4/2016 |

OTHER PUBLICATIONS

Feng Wang, Hu Lin, Liaomo Zheng, Lei Yang, Jinjin Feng, Han Zhang, "Design and implementation of five-axis transformation function in CNC system," Chinese Journal of Aeronautics, vol. 27, Issue 2, pp. 425-437, 2014, retrieved from the internet, [retrieved on Aug. 13, 2019] (Year: 2014).*
Japanese Office Action dated Apr. 10, 2018, for Japanese Patent Application No. 2016-249224.
German Office Action dated May 20, 2020, for German Patent Application No. DE 102017223306.0.

* cited by examiner

LASER PROCESSING HEAD AND LASER PROCESSING SYSTEM INCLUDING THE SAME

CROSS-REFERENCE TO RELATED APPLICATIONS

This application is based on and claims priority to Japanese Patent Application No. 2016-249224, filed on Dec. 22, 2016, the entire content of which is incorporated herein by reference.

FIELD OF THE INVENTION

The present invention relates to a laser processing head and a laser processing system including the laser processing head.

BACKGROUND OF THE INVENTION

A laser processing system of this type has been known that includes: a laser beam output section that is fixed to a frame and emits laser beam light downward; and a robot that includes a plurality of movable portions and supports a workpiece, in which the workpiece is moved below the laser beam output section by the robot and a position and posture of the workpiece are changed by the robot to perform laser processing on an position of the workpiece (for example, see Japanese Unexamined Patent Application, Publication No. 2015-7267).

In addition, a laser processing apparatus has been known that includes: a workpiece fixing section that fixes a workpiece; a welding robot that includes, at its distal end, a laser beam output section emitting a laser beam toward the workpiece fixed to the workpiece fixing section; a memory that stores an operation program for operating the welding robot to emit the laser beam along a target process path on the workpiece; a teach pendant through which the operation program is created; and an image data generation device that detects difference between the target process path and a path on which welding is actually performed by the laser beam, in which the operation of the robot is controlled by using image data generated by the image data generation device (for example, see Japanese Unexamined Patent Application, Publication No. 2012-157867).

SUMMARY OF THE INVENTION

A laser processing head according to a first aspect of the present invention is a laser processing head that is supported by a robot and emits a laser beam to a workpiece supported by a supporting apparatus that moves the workpiece during laser processing, the laser processing head including: at least one optical path changing member that reflects or refracts, toward the workpiece, the laser beam emitted from a predetermined laser beam output section so as to emit the laser beam to the workpiece; a driver that changes posture or a position of the optical path changing member; a control unit that controls the driver; and a memory that stores target path information indicating a target path of the laser processing on the workpiece, wherein the control unit receives information relating to a relative position of the workpiece with respect to the laser processing head whose position and/or posture is changed by the robot while the laser processing is performed on the workpiece, and the control unit controls the driver by using the received information relating to the relative position and the target path information so as to perform the laser processing along the target path.

In addition, a laser processing system according to a second aspect of the present invention includes: a supporting apparatus that supports a workpiece and moves the workpiece during laser processing; a laser processing head that is supported by a robot and includes at least one optical path changing member, the optical path changing member being for reflecting or refracting a laser beam emitted from a predetermined laser beam output section toward the workpiece that is supported by the supporting apparatus and that is moved during the laser processing; a driver that is provided in the laser processing head and changes posture or a position of the optical path changing member; a control unit that controls the driver; and a memory that stores target path information indicating a target path of the laser processing on the workpiece, wherein the control unit receives information relating to a relative position of the workpiece with respect to the laser processing head whose position and/or posture is changed by the robot while the laser processing is performed on the workpiece, and the control unit controls the driver by using the received information relating to the relative position and the target path information so as to perform the laser processing along the target path.

A laser processing head according to a third aspect of the present invention is a laser processing head that emits a laser beam to a workpiece supported by a supporting robot that moves the workpiece during laser processing, the laser processing head including: at least one optical path changing member that reflects or refracts, toward the workpiece, the laser beam emitted from a predetermined laser beam output section so as to emit the laser beam to the workpiece; a driver that changes posture or a position of the optical path changing member; a control unit that controls the driver; and a memory that stores target path information indicating a target path of the laser processing on the workpiece, wherein the control unit receives information relating to a relative position of the workpiece with respect to the laser processing head while the laser processing is performed on the workpiece, and the control unit controls the driver by using the received information relating to the relative position and the target path information so as to perform the laser processing along the target path.

Further, a laser processing system according to a fourth aspect of the present invention includes: a supporting robot that supports a workpiece and moves the workpiece during laser processing; a laser processing head that includes at least one optical path changing member, the optical path changing member being for reflecting or refracting a laser beam emitted from a predetermined laser beam output section toward the workpiece that is supported by the supporting robot and is moved during the laser processing; a driver that is provided in the laser processing head and changes posture or a position of the optical path changing member; a control unit that controls the driver; and a memory that stores target path information indicating a target path of the laser processing on the workpiece, wherein the control unit receives information relating to a relative position of the workpiece with respect to the laser processing head while the laser processing is performed on the workpiece, and the control unit controls the driver by using the received information relating to the relative position and the target path information so as to perform the laser processing along the target path.

DESCRIPTION OF EMBODIMENTS OF THE INVENTION

A laser processing system according to a first embodiment of the present invention is described below with reference to the drawings.

Figure 1:
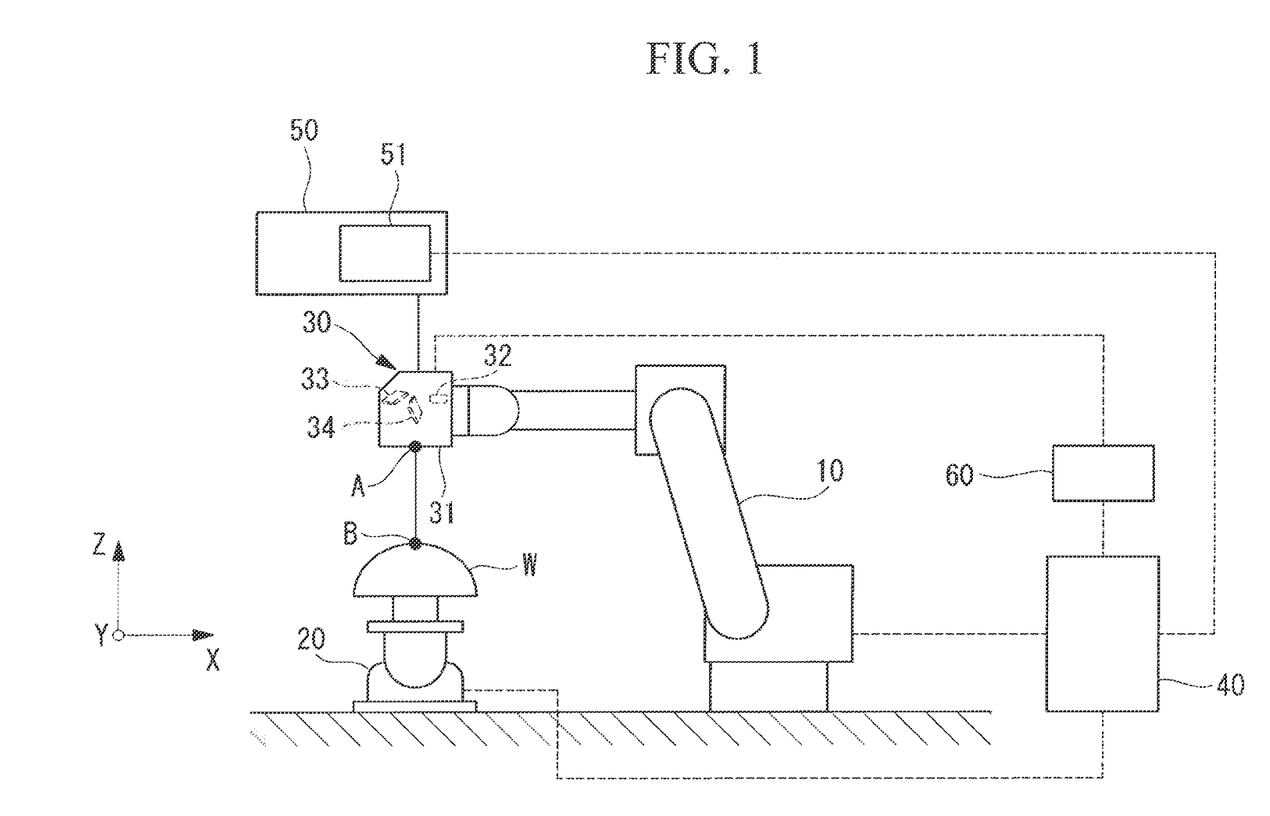
FIG. 1 is a schematic diagram of a laser processing system according to a first embodiment of the present invention.

As illustrated in FIG. 1, the laser processing system includes: a first robot 10 that supports a laser processing head 30 at its distal end part; a second robot 20 serving as a supporting apparatus that supports a workpiece W; a robot controller 40 that controls the first robot 10 and the second robot 20; a laser oscillator 50 that supplies a laser beam to the laser processing head 30; and a head controller 60 that controls the laser processing head 30.

The laser oscillator 50 includes a laser control unit 51 that is configured of a computer including a CPU, a RAM, a ROM, and the like. The laser control unit 51 controls intensity, a supply time, timing, etc. of the laser beam supplied to the laser processing head 30. For example, the laser control unit 51 controls the intensity, the supply time, the timing, etc. of the laser beam supplied to the laser processing head 30 on the basis of control instructions from the robot controller 40 or the head controller 60.

Figure 2:
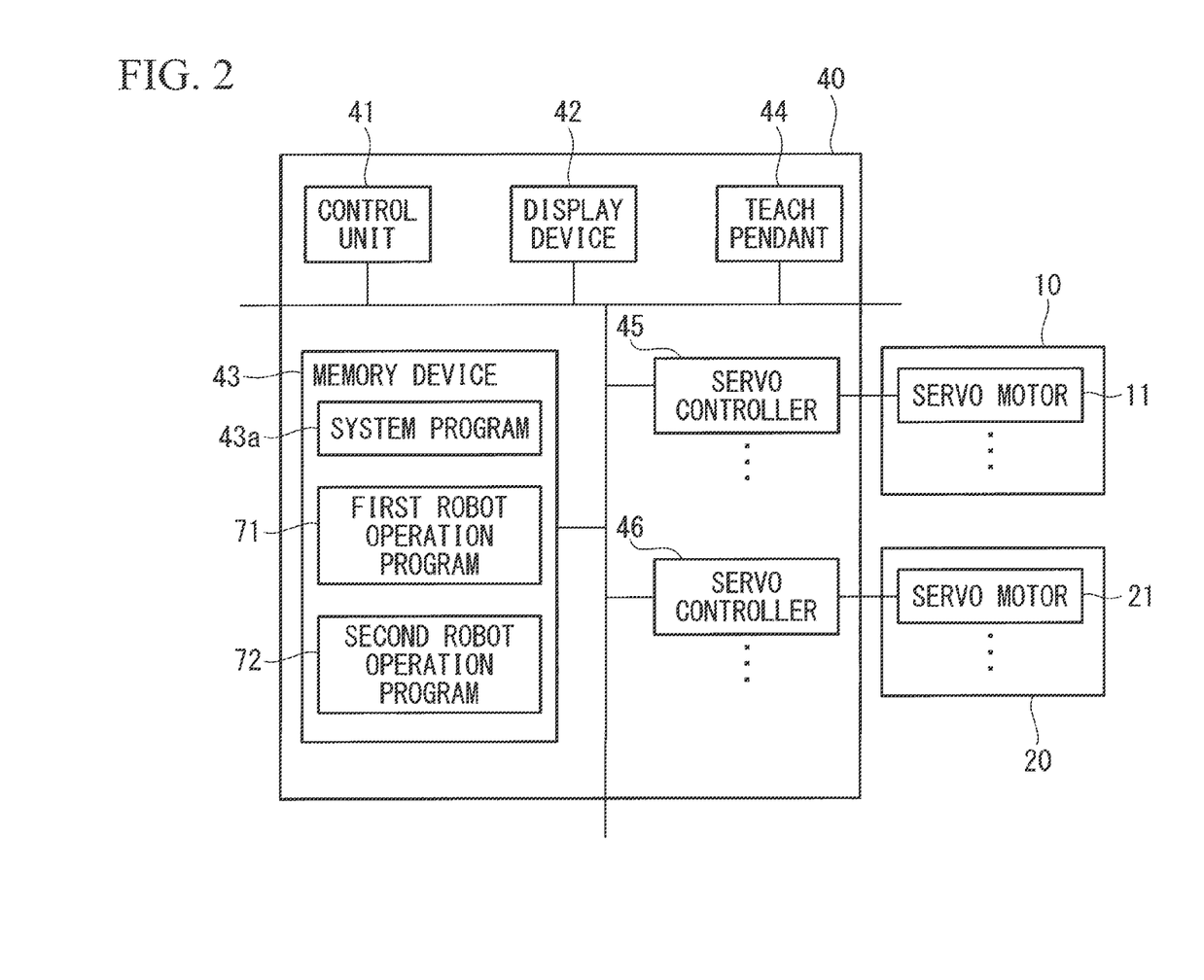
FIG. 2 is a block diagram of a robot controller of the laser processing system according to the first embodiment.

The first robot 10 includes a plurality of movable portions, and a plurality of servo motors 11 that respectively drive the plurality of movable portions (see FIG. 2). As each of the servo motors 11, various kinds of servo motors including a rotary motor and a linear motor may be used. Each of the servo motors 11 includes an operation position detection device detecting an operation position thereof, such as an encoder. A detected value of the operation position detection device is transmitted to the robot controller 40.

The second robot 20 includes a plurality of movable portions. For example, a first shaft of the second robot 20 is configured to be tilted in an X axis direction of FIG. 1, and a second shaft that is disposed on the distal end side relative to the first shaft is configured to rotate around a center axis of the first shaft. In addition, the second robot 20 includes a plurality of servo motors 21 that respectively drive the plurality of movable portions (see FIG. 2). As each of the servo motors 21, various kinds of servo motors including a rotary motor and a linear motor may be used. Each of the servo motors 21 includes an operation position detection device which detects an operation position thereof, such as an encoder. A detected value of the operation position detection device is transmitted to the robot controller 40.

The robot controller 40 includes: a control unit 41 having, for example, a CPU and a RAM; a display device 42; a memory device 43 serving as a memory including, for example, a non-volatile memory and a ROM; a teach pendant 44 that is operated to, for example, create operation programs of the first robot 10 and the second robot 20; a plurality of servo controllers 45 that are provided corresponding to the respective servo motors 11 of the first robot 10; and a plurality of servo controllers 46 that are provided corresponding to the respective servo motors 21 of the second robot 20 (see FIG. 2). For example, the second robot 20 is controlled, as an additional shaft of the first robot, by the robot controller 40.

The memory device 43 stores a system program 43a, and the system program 43a bears a basic function of the robot controller 40. In addition, the memory device 43 stores at least one first robot operation program 71 and at least one second robot operation program 72 that are created by using the teach pendant 44.

For example, the control unit 41 operates according to the system program 43a, reads the first robot operation program 71 stored in the memory device 43 and temporarily stores the first robot operation program 71 in the RAM, transmits a control signal to each of the servo controllers 45 according to the read first robot operation program 71, thereby controlling servo amplifiers of the respective servo motors 11 of the first robot 10. As an example, the first robot operation program 71 is created in order to control a position and posture of the laser processing head 30 supported by the first robot 10, in laser processing.

Further, the control unit 41 reads the second robot operation program 72 stored in the memory device 43 and temporarily stores the second robot operation program 72 in the RAM, transmits a control signal to each of the servo controllers 46 according to the read second robot operation program 72, thereby controlling servo amplifiers of the respective servo motors 21 of the second robot 20. As an example, the second robot operation program 72 is created in order to control a position and posture of the workpiece W supported by the second robot 20 in the laser processing.

Figure 4:
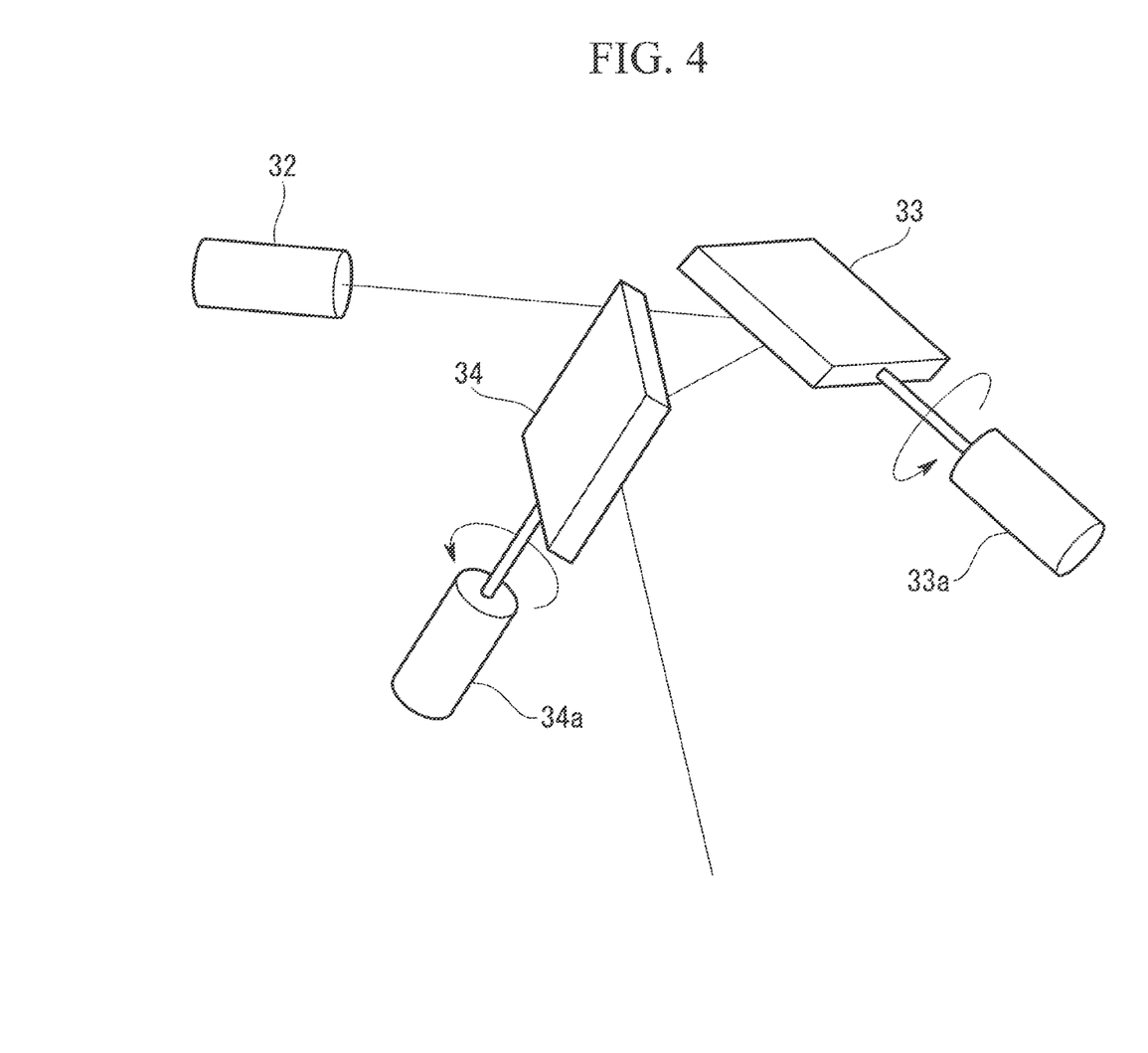
FIG. 4 is a perspective view of a main part of a laser processing head according to the first embodiment.

As illustrated in FIG. 1 and FIG. 4, the laser processing head 30 includes: a head body 31 that is supported at the distal end part of the first robot 10; a laser beam output section 32 attached to the head body 31; a first optical path changing member 33 that is attached to the head body 31 through a first servo motor 33a serving as a driver; and a second optical path changing member 34 that is attached to the head body 31 through a second servo motor 34a serving as a driver.

The laser beam output section 32 is connected to the laser oscillator 50 through an optical fiber, and emits the laser beam supplied from the laser oscillator 50. The laser beam emitted from the laser beam output section 32 is reflected by the first optical path changing member 33 toward the second optical path changing member 34, and the laser beam from the first optical path changing member 33 is reflected by the second optical path changing member 34 toward the workpiece W that is supported by the second robot 20.

Figure 3:
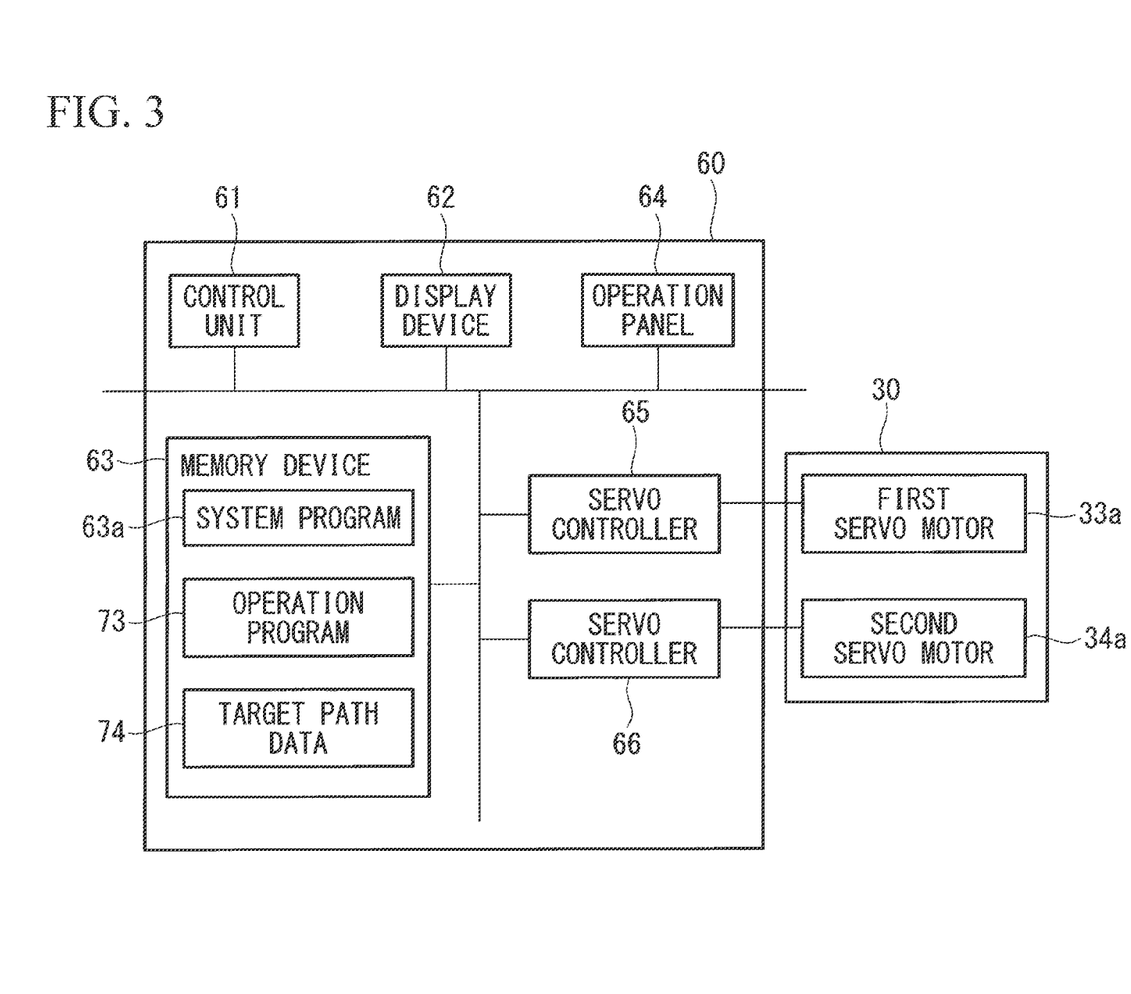
FIG. 3 is a block diagram of a head controller of the laser processing system according to the first embodiment.

For example, the head controller 60 includes: a control unit 61 that has, for example, a CPU and a RAM; a display device 62; a memory device 63 serving as a memory having, for example, a non-volatile memory or a ROM; an operation panel 64 that is operated to, for example, create operation programs of the first and second servo motors 33a and 34a;

a servo controller 65 for the first servo motor 33*a*; and a servo controller 66 for the second servo motor 34*a* (see FIG. 3).

The memory device 63 stores a system program 63*a*, and the system program 63*a* bears a basic function of the head controller 60. Further, the memory device 63 stores at least one operation program 73 created by using the operation panel 64. Moreover, the memory device 63 stores target path information 74 for each kind of the workpiece W. The target path information 74 is positional information of a group of process points or a process line on three-dimensional coordinates that indicates a laser processing path of the workpiece W supported by the second robot 20.

For example, the control unit 61 operates according to the system program 63*a*, reads the operation program 73 stored in the memory device 63, temporarily stores the operation program 73 in the RAM, and transmits a control signal to each of the servo controllers 65 and 66 according to the read operation program 73, thereby controlling servo amplifiers of the respective servo motors 33*a* and 34*a*.

In this example, the control unit 61 receives, from the robot controller 40, information of a predetermined position of the laser processing head 30 supported by the first robot 10 and information of a predetermined position of the workpiece W supported by the second robot 20. The information of the predetermined position of the laser processing head 30 is, for example, positional information (Xa, Ya, Za) of a point A on a lower surface on the three-dimensional coordinates. The information of the predetermined position of the workpiece W is, for example, positional information (Xb, Yb, Zb) of a point B on a top surface of the workpiece W on the three-dimensional coordinates. The positional information is used as information relating to a relative position of the workpiece W with respect to the laser processing head 30.

In addition, the operation program 73 generates the control signals for the respective servo controllers 65 and 66 on the basis of the received positional information (Xa, Ya, Za), the received positional information (Xb, Yb, Zb), and the target path information 74, and supplies the control signals to the respective servo controllers 65 and 66 in order to emit the laser beam to a point (Xt, Yt, Zt) on three-dimensional coordinates in the group of process points or on the process line that is a target path.

Setting for the laser processing of a certain workpiece W is performed by, for example, a worker with the following manner.

The worker creates the first robot operation program 71 and the second robot operation program 72 by using the teach pendant 44 in order to emit the laser beam to the workpiece W from the laser processing head 30 according to the target path information 74 for the workpiece W supported by the second robot 20. The worker stores the created first robot operation program 71 and the created second robot operation program 72 in the memory device 43.

At this time, precise adjustment of irradiation positions of the laser beam is performed by the laser processing head 30. Therefore, it is sufficient for the first robot operation program 71 and the second robot operation program 72 to relatively move the laser processing head 30 and the workpiece W so as to direct a vicinity of the laser beam output section of the laser processing head 30 to a processed position side of the workpiece W.

Figure 5:
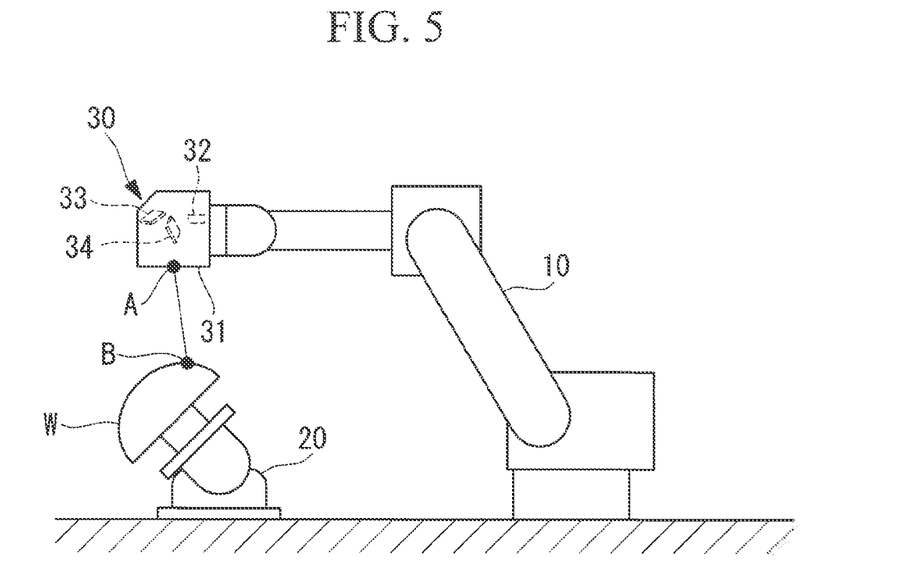
FIG. 5 is an explanatory diagram showing operation of the laser processing system according to the first embodiment.

For example, as illustrated in FIG. 5, in a case where process by a laser beam is performed on a semispherical top surface of the workpiece W, the first robot operation program 71 and the second robot operation program 72 are created such that the laser processing head 30 and the workpiece W relatively move while the bottom surface of the laser processing head 30 that emits the laser beam faces the top surface of the workpiece W.

Figure 6:
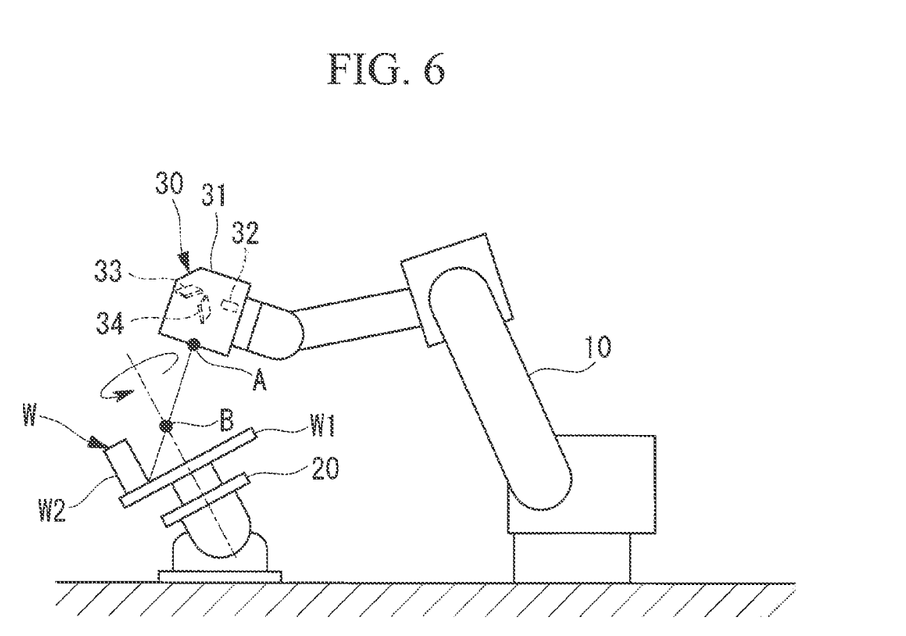
FIG. 6 is an explanatory diagram showing operation of the laser processing system according to the first embodiment.

In addition, as illustrated in FIG. 6, in a case where the workpiece W has a shape including a disk portion W1 and a columnar portion W2 to be welded on the disk portion W1, and a peripheral edge of a lower end of the columnar portion W2 is to be welded on a top surface of the disk portion W1 by the laser beam, the first robot operation program 71 and the second robot operation program 72 are created such that the columnar portion W2 rotates with respect to the laser processing head 30 while the bottom surface of the laser processing head 30 that emits the laser beam faces the peripheral edge of the lower end of the columnar portion W2.

In contrast, the worker stores the target path information 74 for the workpiece W illustrated in FIG. 5 or FIG. 6, in the memory device 63 of the head controller 60. As a result, the control unit 61 supplies the control signals to the respective servo controllers 65 and 66 according to operation of the first robot 10 and the second robot 20 on the basis of the positional information (Xa, Ya, Za) of the point A, the positional information (Xb, Yb, Zb) of the point B, and the target path information 74 while the first robot 10 and the second robot 20 operate respectively according to the above-described robot operation programs 71 and 72. The laser beam is accordingly applied along the target path.

At this time, the control unit 61 calculates the relative position of the point B with respect to the point A on the basis of the positional information (Xa, Ya, Za) of the point A and the positional information (Xb, Yb, Zb) of the point B. Alternatively, the relative position may be calculated by the control unit 41 of the robot controller 40, and the control unit 61 may receive a result of the calculation.

In the present embodiment, the control unit 41 receives relative-position related information that indicates the relative positions of the three-dimensional coordinate position of the laser processing head 30 attached to the first robot 10 and the three-dimensional coordinate position of the workpiece W supported by the second robot 20, and the posture of each of the optical path changing members 33 and 34 is controlled by using the relative-position related information and the target path information 74 such that the laser processing is performed along the target path.

Accordingly, even if the operation of the first robot 10 and the operation of the second robot 20 are not completely coincident with the target path, the irradiation position of the laser beam is corrected by the laser processing head 30 by using the relative positions on the first robot 10 side and the second robot 20 side and the target path information 74. This makes it possible to facilitate the setting work also in a case where the operation of the first robot 10 and the operation of the second robot 20 are set depending on the kind of the workpiece W.

Figure 7:
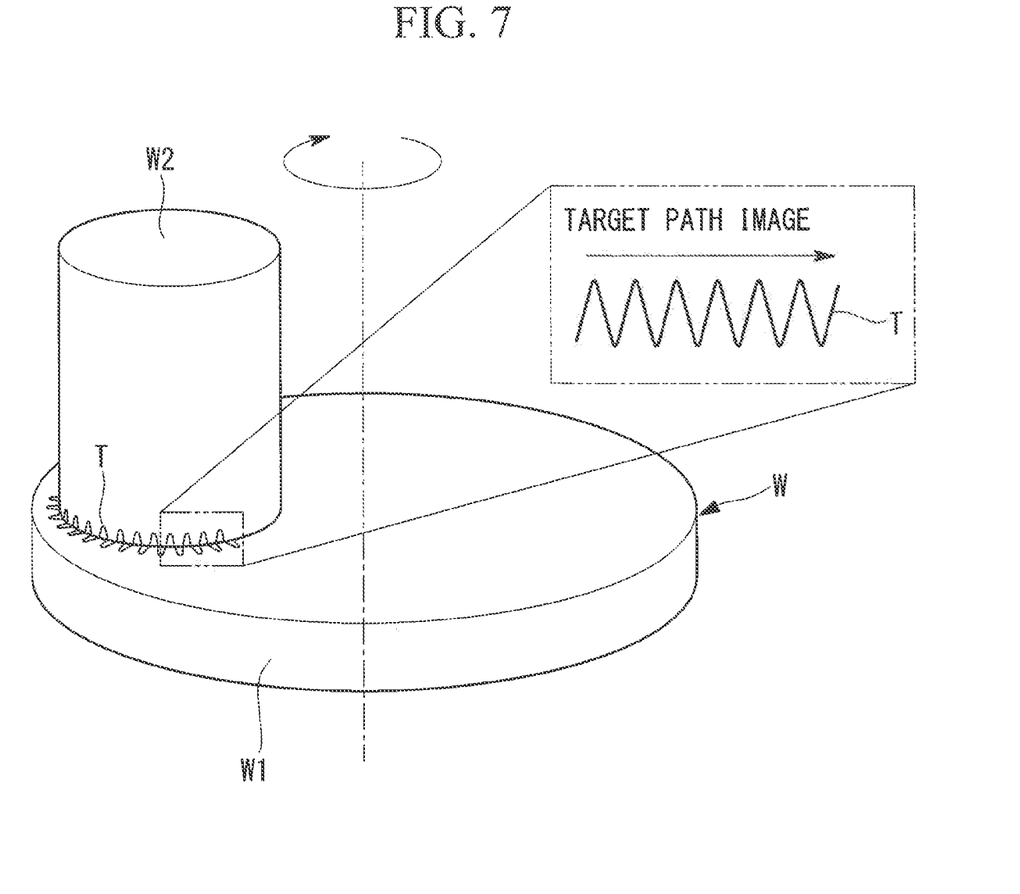
FIG. 7 is a perspective view of a workpiece in the first embodiment.
Figure 8:
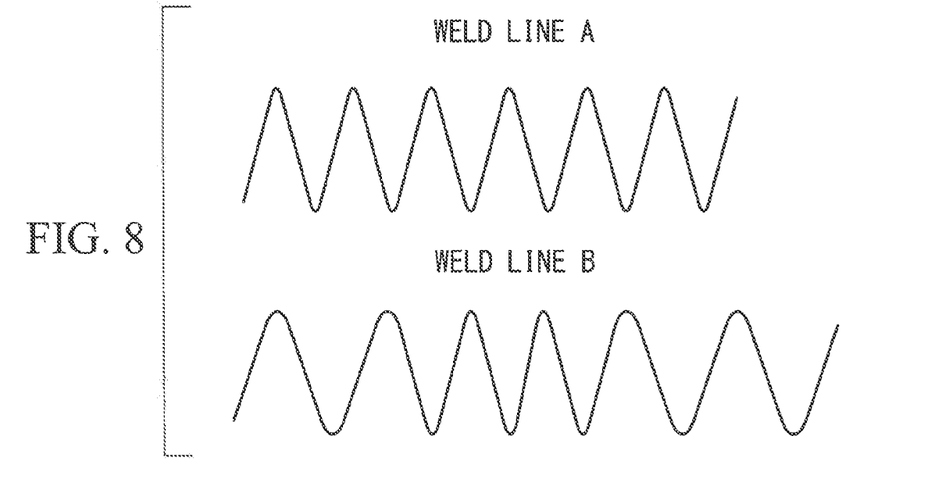
FIG. 8 is a diagram illustrating examples of a weld line of the workpiece processed in the first embodiment.

For example, when welding by a laser beam (laser processing) is performed on the workpiece W illustrated in FIG. 6 along a target path T illustrated in FIG. 7, in a case where the laser processing head 30 is not used, it is necessary to operate the first robot 10 and the second robot 20 along the target path T. It is difficult to move the first and second robots 10 and 20 along the target path T at high speed, and the setting therefor is also difficult. Further, the weld line on which the welding has been actually performed tends to become irregular as a weld line B illustrated in FIG. 8. In contrast, in the present embodiment, it is possible to move the irradiation position of the laser beam along the target path T at high speed, and to facilitate the setting therefor. This allows for accurate welding as a weld line A of FIG. 8.

A laser processing system according to a second embodiment of the present invention is described below with reference to drawings.

Figure 9:
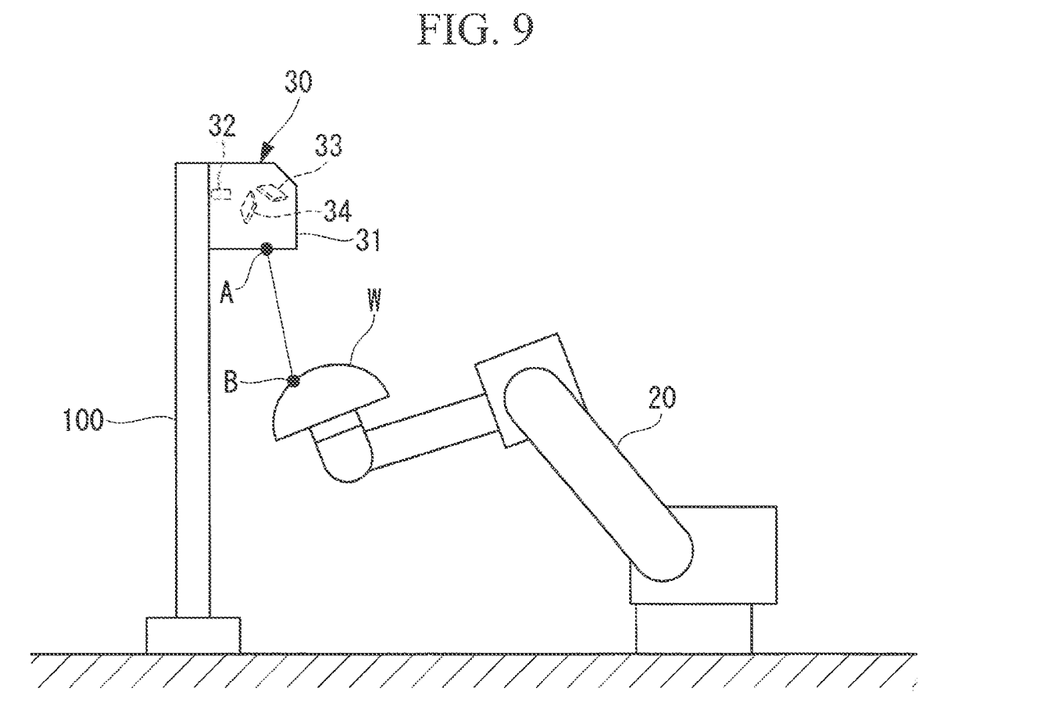
FIG. 9 is a schematic diagram of a laser processing system according to a second embodiment of the present invention.

As illustrated in FIG. 9, in the laser processing system, the laser processing head 30 that is supported by the first robot 10 in the first embodiment is fixed to a frame 100, and other configuration of the second embodiment is similar to the configuration of the first embodiment. Components similar to those in the first embodiment are denoted by the same reference numerals, and description of such components is omitted. Note that the laser processing system according to the second embodiment also includes the robot controller 40, the laser oscillator 50, and the head controller 60 similar to those in the first embodiment.

In the second embodiment, the second robot 20 that supports the workpiece W includes a larger number of movable portions than the movable portions of the first embodiment; however, the second robot 20 described in the first embodiment is also usable. Also in the second embodiment, the servo motors 21 of the respective movable portions of the second robot 20 are controlled by the control unit 41 of the robot controller 40.

In a case of performing setting for the laser processing of the workpiece W in the second embodiment, the worker creates the second robot operation program 72 by using the teach pendant 44 in order to emit the laser beam to the workpiece W from the laser processing head 30 according to the target path information 74 for the workpiece W supported by the second robot 20. The worker stores the created second robot operation program 72 in the memory device 43.

At this time, precise adjustment of an irradiation position of the laser beam is performed by the laser processing head 30. Therefore, it is sufficient for the second robot operation program 72 to relatively move the laser processing head 30 and the workpiece W so as to direct the vicinity of the laser beam output section of the laser processing head 30 to the processed position side of the workpiece W.

Figure 10:
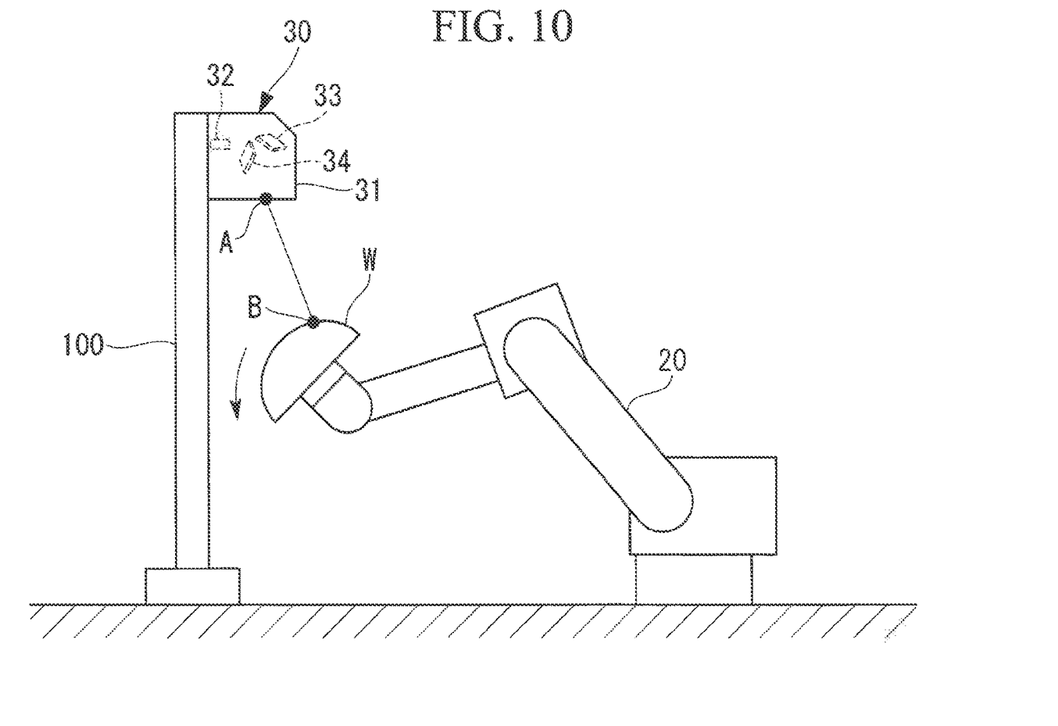
FIG. 10 is an explanatory diagram showing operation of the laser processing system according to the second embodiment.

For example, as illustrated in FIG. 9 and FIG. 10, in a case where process by a laser beam is performed on a semispherical top surface of the workpiece W, the second robot operation program 72 is created such that the laser processing head 30 and the workpiece W relatively move while the top surface of the workpiece W faces the bottom surface of the laser processing head 30 that emits the laser beam.

In contrast, the worker stores the target path information 74 for the workpiece W illustrated in FIG. 9, in the memory device 63 of the head controller 60. As a result, the control unit 61 supplies the control signals to the respective servo controllers 65 and 66 according to operation of the second robot 20 on the basis of the positional information (Xa, Ya, Za) of the point A, the positional information (Xb, Yb, Zb) of the point B, and the target path information 74 while the second robot 20 operates according to the second robot operation program 72. The laser beam is accordingly applied along the target path.

At this time, the control unit 61 calculates the relative position of the point B with respect to the point A on the basis of the positional information (Xa, Ya, Za) of the point A and the positional information (Xb, Yb, Zb) of the point B. Alternatively, the relative position may be calculated by the control unit 41 of the robot controller 40, and the control unit 61 may receive a result of the calculation.

Also in the second embodiment, the control unit 41 receives the relative-position related information that indicates the relative positions of the three-dimensional coordinate position of the laser processing head 30 fixed to the frame 100 and the three-dimensional coordinate position of the workpiece W supported by the second robot 20, and the posture of each of the optical path changing members 33 and 34 is controlled by using the relative-position related information and the target path information 74 such that the laser processing is performed along the target path.

Accordingly, even if the operation of the second robot 20 is not completely coincident with the target path, the irradiation position of the laser beam is corrected by the laser processing head 30 by using the relative positions on the laser processing head 30 side and the second robot 20 side and the target path information 74. This makes it possible to facilitate the setting work also in a case where the operation of the second robot 20 is set depending on the kind of the workpiece W.

Note that, in the first and second embodiments, the control unit 61 of the head controller 60 controls the servo motors 33a and 34a. In contrast, the target path information 74 may be stored in the memory device 43 of the robot controller 40, and the control unit 41 of the robot controller 40 may control, by using the relative-position related information and the target path information 74, the posture of each of the optical path changing members 33 and 34 so as to perform the laser processing along the target path.

Further, in the first and second embodiments, the control unit 61 may receive, as the relative-position related information, the detection values of the respective operation position detection devices of the servo motors 11 and 21 of the first robot 10 and the second robot 20. The action and effects similar to those described above are achievable also in this case.

Figure 11:
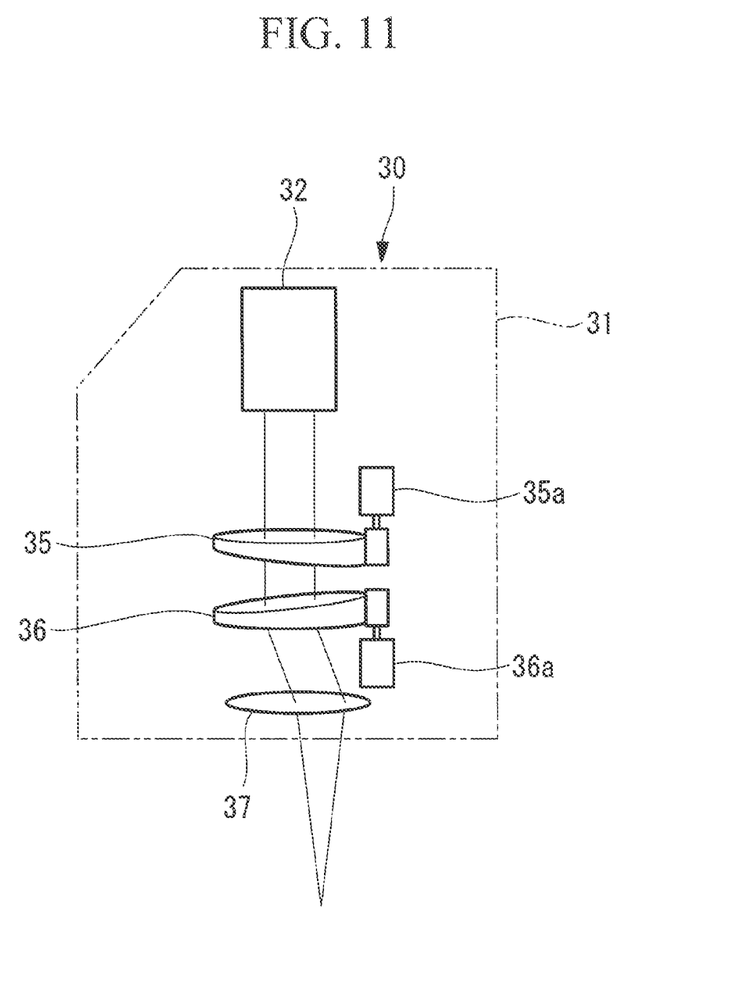
FIG. 11 is a side view of a main part of a laser processing head illustrating a modification of the first and second embodiments.

Moreover, in the first and second embodiments, as illustrated in FIG. 11, a first optical path changing member 35 changing the optical path of the laser beam from the laser beam output section 32, a second optical path changing member 36 changing an optical path of a laser beam that has passed through the first optical path changing member 35, and a focusing lens 37 focusing a laser beam from the second optical path changing member 36 on the irradiation position may be provided in the head body 31 of the laser processing head 30, in place of the optical path changing members 33 and 34.

In this case, each of the first and second optical path changing members 35 and 36 is a lens, a thickness of which is varied from one end toward the other end in a radial direction. The first optical path changing member 35 is configured to be changed in position in the rotation direction around an optical axis by a first servo motor 35a serving as a driver. The second optical path changing member 36 is also configured to be changed in position in the rotation direction around the optical axis by a second servo motor 36a serving as a driver.

The laser beam emitted from the laser beam output section 32 is refracted by the first optical path changing member 35 and the second optical path changing member 36, and the refracted laser beam is then focused on the irradiation position by the focusing lens 37. At this time, since the thickness of each of the first and second optical path changing members 35 and 36 is varied from the one end toward the other end in the radial direction, the irradiation position of the laser beam is changed when the optical path changing members 35 and 36 are respectively rotated by the first and second servo motors 35a and 36a.

The first and second servo motors 35a and 36a are connected to the head controller 60 through respective servo controllers, and a control signal is transmitted to each of the servo motors 35a and 36a by the control unit 61 as the servo motors 33a and 34a are controlled in the above-described embodiments. Therefore, as with the above-described embodiments, it is possible to facilitate the setting work also in the case where the operation of the first robot 10 and the operation of the second robot 20 are set depending on the kind of the workpiece W.

Note that each of the first and second optical path changing members 35 and 36 may be configured of a lens, the thickness of which is not varied in the radial direction, and the postures of the first and second optical path changing members 35 and 36 may be respectively changed by the servo motors 35a and 36a.

Moreover, in the first and second embodiments, the positions of the first and second optical path changing members 33 and 34 may be respectively changed by the servo motors 33a and 34a.

The inventors have arrived at the following aspects of the present invention.

A laser processing head according to a first aspect of the present invention is a laser processing head that is supported by a robot and emits a laser beam to a workpiece supported by a supporting apparatus that moves the workpiece during laser processing, the laser processing head including: at least one optical path changing member that reflects or refracts, toward the workpiece, the laser beam emitted from a predetermined laser beam output section so as to emit the laser beam to the workpiece; a driver that changes posture or a position of the optical path changing member; a control unit that controls the driver; and a memory that stores target path information indicating a target path of the laser processing on the workpiece, wherein the control unit receives information relating to a relative position of the workpiece with respect to the laser processing head whose position and/or posture is changed by the robot while the laser processing is performed on the workpiece, and the control unit controls the driver by using the received information relating to the relative position and the target path information so as to perform the laser processing along the target path.

In addition, a laser processing system according to a second aspect of the present invention includes: a supporting apparatus that supports a workpiece and moves the workpiece during laser processing; a laser processing head that is supported by a robot and includes at least one optical path changing member, the optical path changing member being for reflecting or refracting a laser beam emitted from a predetermined laser beam output section toward the workpiece that is supported by the supporting apparatus and that is moved during the laser processing; a driver that is provided in the laser processing head and changes posture or a position of the optical path changing member; a control unit that controls the driver; and a memory that stores target path information indicating a target path of the laser processing on the workpiece, wherein the control unit receives information relating to a relative position of the workpiece with respect to the laser processing head whose position and/or posture is changed by the robot while the laser processing is performed on the workpiece, and the control unit controls the driver by using the received information relating to the relative position and the target path information so as to perform the laser processing along the target path.

With the above-described aspects, for example, the control unit receives relative-position related information that indicates the relative positions of a three-dimensional coordinate position of the laser processing head supported by the robot and a three-dimensional coordinate position of the workpiece supported by the supporting apparatus, and the control unit controls the posture or the position of the optical path changing member by using the relative-position related information and the target path information, to perform the laser processing along the target path.

To perform the laser processing in a state where the workpiece is moved by the supporting apparatus and the position and/or the posture of the laser processing head is changed by the robot during the laser processing, it is necessary to set the operation of the robot and the operation of the supporting apparatus during the laser processing. When the above-described configuration is used even if the set operation of the robot and the set operation of the supporting apparatus are not completely coincident with the target path, the irradiation position of the laser beam is corrected by the laser processing head by using the relative positions on the robot side and the supporting apparatus side and the target path information. This makes it possible to facilitate the setting work in the case where the operation of the robot and the operation of the supporting apparatus are set depending on the kinds of the workpieces.

A laser processing head according to a third aspect of the present invention is a laser processing head that emits a laser beam to a workpiece supported by a supporting robot that moves the workpiece during laser processing, the laser processing head including: at least one optical path changing member that reflects or refracts, toward the workpiece, the laser beam emitted from a predetermined laser beam output section so as to emit the laser beam to the workpiece; a driver that changes posture or a position of the optical path changing member; a control unit that controls the driver; and a memory that stores target path information indicating a target path of the laser processing on the workpiece, wherein the control unit receives information relating to a relative position of the workpiece with respect to the laser processing head while the laser processing is performed on the workpiece, and the control unit controls the driver by using the received information relating to the relative position and the target path information so as to perform the laser processing along the target path.

Further, a laser processing system according to a fourth aspect of the present invention includes: a supporting robot that supports a workpiece and moves the workpiece during laser processing; a laser processing head that includes at least one optical path changing member, the optical path changing member being for reflecting or refracting a laser beam emitted from a predetermined laser beam output section toward the workpiece that is supported by the supporting robot and is moved during the laser processing; a driver that is provided in the laser processing head and changes posture or a position of the optical path changing member; a control unit that controls the driver; and a memory that stores target path information indicating a target path of the laser processing on the workpiece, wherein the control unit receives information relating to a relative position of the workpiece with respect to the laser processing head while the laser processing is performed on the workpiece, and the control unit controls the driver by using the received information relating to the relative position and the target path information so as to perform the laser processing along the target path.

With these aspects, for example, the control unit receives relative-position related information that indicates the relative positions of a three-dimensional coordinate position of the laser processing head and a three-dimensional coordinate position of the workpiece supported by the supporting robot, and the control unit controls the posture or the position of the optical path changing member by using the relative-position related information and the target path information, to perform the laser processing along the target path.

To perform the laser processing in a state where the workpiece is moved by the supporting robot during the laser processing, it is necessary to set the operation of the supporting robot during the laser processing. When the above-described configuration is used even if the set operation of the supporting robot is not completely coincident with the target path, the irradiation position of the laser beam is corrected by the laser processing head by using the relative positions on the laser processing head and the supporting robot side and the target path information. This makes it possible to facilitate the setting work in the case where the operation of the supporting robot is set depending on the kinds of the workpieces.

The aforementioned aspects make it possible to facilitate the setting work performed for each kind of workpiece.

The invention claimed is:

1. A laser processing head which has a head controller different from a robot controller, which is connected to a robot and the head controller, and which emits a laser beam to a workpiece supported by a support robot during laser processing, the laser processing head comprising:
a head body attached to a distal end portion of the robot,
at least one optical path changing member that is arranged in the head body and that reflects or refracts, toward the workpiece, the laser beam emitted from a predetermined laser beam output section so as to emit the laser beam to the workpiece;
a driver that is arranged in the head body and that changes an orientation or a position of the optical path changing member; and
a memory that is arranged in the head controller and that stores target path information indicating a target path of the laser processing on the workpiece,
wherein the head controller receives, from the robot controller, positional information of the laser processing head in three-dimensional coordinates, which is changed by operation positions of first plurality of motors of an arm of the robot, and positional information of the workpiece in the three-dimensional coordinates, which is changed by operation positions of second plurality of motors of an arm of the support robot,
wherein the robot controller stores and executes a first program to control the operation positions of the first plurality of motors of an arm of the robot in order to control positions and postures of the laser processing head attached to the robot while the laser processing is performed on the workpiece,
wherein the robot controller stores and executes a second program to control the operation positions of the second plurality of motors of an arm of the support robot in order to control positions and postures of the workpiece supported by the support robot while the laser processing is performed on the workpiece,
wherein the head controller calculates a relative position of the workpiece with respect to the laser processing head based on the positional information of the laser processing head and the positional information of the workpiece while the position and/or orientation of the laser processing head is being changed by the robot while the laser processing is performed on the workpiece, and wherein the head controller stores and executes a third program to control the driver and the target path of the laser processing on the workpiece while the laser processing is performed on the workpiece, wherein the head controller controls the driver according to the third program using the calculated relative position and the target path information so as to perform the laser processing along the target path.

2. A laser processing head which has a head controller different from a robot controller, which is connected to a robot and the head controller, and which emits a laser beam to a workpiece supported by a support robot during laser processing, the laser processing head comprising:
a head body attached to an unmovable frame,
at least one optical path changing member that is arranged in the head body and that reflects or refracts, toward the workpiece, the laser beam emitted from a predetermined laser beam output section so as to emit the laser beam to the workpiece;
a driver that is arranged in the head body and that changes an orientation or a position of the optical path changing member;
a memory that is arranged in the head controller and that stores target path information indicating a target path of the laser processing on the workpiece,
wherein the head controller recognizes positional information of the laser processing head in three-dimensional coordinates and receives, from the robot controller, positional information of the workpiece in the three-dimensional coordinates which is changed by operation positions of the respective motors of the support robot,
wherein the robot controller stores and executes a first program to control the operation positions of the respective motors of the support robot in order to control positions and postures of the workpiece supported by the support robot while the laser processing is performed on the workpiece,
wherein the head controller calculates a relative position of the workpiece with respect to the laser processing head based on the positional information of the laser processing head and the positional information of the workpiece while the position and/or orientation of the workpiece is being changed by the support robot while the laser processing is performed on the workpiece, and
wherein the head controller stores and executes a second program to control the target path of the laser processing on the workpiece while the laser processing is performed on the workpiece, wherein the head controller controls the driver according to the second program by using the calculated relative position and the target path information so as to perform the laser processing along the target path.

3. A laser processing system, comprising:
a first robot;
a second robot adapted to support a workpiece at a second distal end;
a laser processing head connected to a first distal end of the first robot;
a laser emitter disposed in the laser processing head, wherein the laser emitter emits a laser light;
at least one optical path changing member disposed in the laser processing head, wherein the at least one optical path changing member changes a path of the laser light from the laser emitter to the workpiece;

a driver disposed in the laser processing head, wherein the driver changes an orientation or a position of the at least one optical path changing member;

a memory disposed in a head controller that stores target path information indicating a target path of the laser light on the workpiece during laser processing;

a robot controller operatively connected to the first robot and the second robot; and a head controller connected to the robot controller and the driver, wherein the robot controller generates first positional information of the laser processing head in three dimensions changed by operational positions of a first plurality of motors of the first robot, wherein the robot controller generates second positional information of the workpiece in three dimensions changed by operational positions of a second plurality of motors of the second robot, wherein the robot controller stores and executes a first program to control the operational positions of the first plurality of motors of the first robot in order to control positions and postures of the laser processing head connected to the first robot while the laser processing is performed on the workpiece, wherein the robot controller stores and executes a second program to control the operational positions of the second plurality of motors of the second robot in order to control positions and postures of the workpiece supported by the second robot while the laser processing is performed on the workpiece, wherein the head controller receives the first positional information and the second positional information from the robot controller and calculates a relative position of the workpiece with respect to the laser processing head based on the first positional information and the second positional information, and wherein the head controller stores and executes a third program to control the target path of the laser processing on the workpiece while the laser processing is performed on the workpiece, wherein the head controller controls the driver according to the third program using the calculated relative position of the workpiece and the target path information so that the laser processing may be performed along the target path.

4. A laser processing system, comprising:

an unmovable frame;

a support robot adapted to support a workpiece at a distal end;

a laser processing head attached to the unmovable frame;

a laser emitter disposed in the laser processing head, wherein the laser emitter emits a laser light;

at least one optical path changing member disposed in the laser processing head, wherein the at least one optical path changing member changes a path of the laser light from the laser emitter to the workpiece;

a driver disposed in the laser processing head, wherein the driver changes an orientation or a position of the at least one optical path changing member;

a memory disposed in a head controller that stores target path information indicating a target path of the laser light on the workpiece during laser processing;

a robot controller operatively connected to the support robot; and a head controller connected to the driver, wherein the robot controller generates positional information of the workpiece in three dimensions, wherein the positional information is changed by operational positions of a plurality of motors of the support robot, wherein the robot controller stores and executes a first program to control the operational positions of the plurality of motors of the support robot in order to control positions and postures of the workpiece supported by the support robot while the laser processing is performed on the workpiece, wherein the head controller recognizes positional information of the laser processing head in three-dimensional coordinates and receives the positional information of the workpiece from the robot controller, wherein the head controller calculates a relative position of the workpiece with respect to the laser processing head based on the positional information of the workpiece and the positional information of the laser processing head, and wherein the head controller stores and executes a second program to control the target path of the laser processing on the workpiece while the laser processing is performed on the workpiece, wherein the head controller controls the driver according to the second program using the calculated relative position of the workpiece and the target path information so that the laser processing may be performed along the target path.

* * * * *